US012597792B2

(12) United States Patent
Liu et al.

(10) Patent No.: US 12,597,792 B2
(45) Date of Patent: Apr. 7, 2026

(54) POWER MODULE AND POWER SUPPLY METHOD THEREOF

(71) Applicant: ASUSTEK COMPUTER INC., Taipei (TW)

(72) Inventors: Chia Yu Liu, Taipei (TW); Yii Lin Wu, Taipei (TW); Kian-Ming Chee, Taipei (TW); Kai-Chun Liang, Taipei (TW); Chia-Jui Shih, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 742 days.

(21) Appl. No.: 17/868,223

(22) Filed: Jul. 19, 2022

(65) Prior Publication Data

US 2023/0208176 A1 Jun. 29, 2023

(30) Foreign Application Priority Data

Dec. 28, 2021 (TW) .................................. 110149035

(51) Int. Cl.
H02J 7/00 (2026.01)

(52) U.S. Cl.
CPC ........ H02J 7/00712 (2020.01); H02J 7/0013 (2013.01); H02J 7/0047 (2013.01)

(58) Field of Classification Search
CPC .................................................. H02J 7/0013
See application file for complete search history.

(56) References Cited

U.S. PATENT DOCUMENTS

| | | | | |
|---|---|---|---|---|
| 6,430,692 B1 * | 8/2002 | Kimble | ................. | H02J 7/0024 |
| | | | | 320/120 |
| 6,497,974 B2 * | 12/2002 | Fuglevand | .......... | H01M 8/0494 |
| | | | | 320/167 |
| 7,535,199 B2 * | 5/2009 | Kimura | ................. | H02J 7/0014 |
| | | | | 320/120 |
| 8,288,992 B2 * | 10/2012 | Kramer | ................. | H02J 7/0016 |
| | | | | 320/121 |
| 2003/0057776 A1 * | 3/2003 | Takase | ................. | H02J 7/1423 |
| | | | | 307/43 |
| 2006/0006841 A1 * | 1/2006 | Lee | ........................ | H02J 7/0013 |
| | | | | 320/116 |

(Continued)

FOREIGN PATENT DOCUMENTS

| | | |
|---|---|---|
| CN | 1770536 A | 5/2006 |
| CN | 103430373 A | 12/2013 |

(Continued)

*Primary Examiner* — Tynese V Mcdaniel
(74) *Attorney, Agent, or Firm* — MUNCY, GEISSLER, OLDS & LOWE, P.C.

(57) ABSTRACT

A power module adapted to a computer system is provided in the disclosure. The power module includes three batteries, a first voltage output terminal, a second voltage output terminal, a third voltage output terminal, and a charging/ discharging control unit. The charging/discharging control unit determines a quantity of serially connected batteries based on a load signal of the computer system, to supply a first voltage to the first voltage output terminal, a second voltage to the second voltage output terminal, or a third voltage to the third voltage output terminal. The first voltage, the second voltage, and the third voltage correspond to different quantities of batteries. The disclosure further provides a power supply method.

14 Claims, 11 Drawing Sheets

(56)  References Cited

U.S. PATENT DOCUMENTS

| | | | | |
|---|---|---|---|---|
| 2014/0125272 A1* | 5/2014 | Weissinger | H02J 7/00712 | 320/137 |
| 2014/0159495 A1* | 6/2014 | Nassar | H02J 7/0068 | 307/71 |
| 2014/0183939 A1* | 7/2014 | Jiang | B60L 1/08 | 429/231.1 |
| 2015/0028796 A1 | 1/2015 | Nakayama et al. | | |
| 2015/0188331 A1* | 7/2015 | Negru | H02J 7/0042 | 320/112 |
| 2015/0303718 A1* | 10/2015 | Nomura | H02J 7/0014 | 320/118 |
| 2016/0094067 A1* | 3/2016 | Li | H02J 7/0013 | 320/137 |
| 2019/0199119 A1* | 6/2019 | Kikuchi | H02J 7/1423 | |
| 2021/0175551 A1* | 6/2021 | Li | H01M 10/46 | |
| 2021/0257841 A1* | 8/2021 | Lee | H02J 7/345 | |
| 2022/0255328 A1* | 8/2022 | Shih | H02J 7/0024 | |
| 2022/0302715 A1* | 9/2022 | Kim | H02J 7/0047 | |
| 2023/0208156 A1* | 6/2023 | Wang | H02J 7/0024 | 320/117 |
| 2023/0291212 A1* | 9/2023 | Mizuno | H02J 7/0013 | |
| 2023/0361595 A1* | 11/2023 | Maarbjerg | H02J 7/007182 | |
| 2024/0356364 A1* | 10/2024 | Liang | H04R 1/1025 | |
| 2025/0007303 A1* | 1/2025 | Yao | H01M 10/46 | |
| 2025/0038547 A1* | 1/2025 | Hsiao | H02J 7/0024 | |

FOREIGN PATENT DOCUMENTS

| | | |
|---|---|---|
| CN | 103094636 B | 4/2017 |
| CN | 104242397 B | 12/2017 |
| CN | 107664726 A | 2/2018 |
| CN | 111830417 A | 10/2020 |
| CN | 113270910 A | 8/2021 |
| JP | 6081165 B2 | 2/2017 |
| JP | 6522513 B2 | 5/2019 |
| TW | 201943168 A | 11/2019 |

* cited by examiner

Receive a load signal from a computer system   ~S120

Determine a quantity of serially connected batteries based on the load signal, to supply a first voltage, a second voltage, or a third voltage to the computer system   ~S140

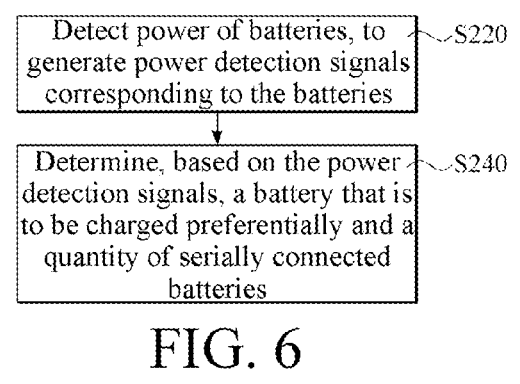

Detect power of batteries, to generate power detection signals corresponding to the batteries ⌐S220

Determine, based on the power detection signals, a battery that is to be charged preferentially and a quantity of serially connected batteries ⌐S240

FIG. 6

POWER MODULE AND POWER SUPPLY METHOD THEREOF

CROSS-REFERENCE TO RELATED APPLICATION

This application claims the priority benefit of Chinese application serial No. 110149035, filed on Dec. 28, 2021. The entirety of the above-mentioned patent application is hereby incorporated by reference herein and made a part of the specification.

BACKGROUND OF THE INVENTION

Field of the Invention

The disclosure relates to the field of charging technologies, and in particular, to a power module that outputs various voltages and a power charging method thereof.

Description of the Related Art

With the advancement of technologies, a portable electronic device includes more and more functions. To provide the functions such as a camera, a speaker, and vibration, various voltage converters usually need to be disposed on the portable electronic device to convert voltages supplied by a battery into voltages required for operation of various functional modules. There are losses during voltage conversion of the voltage converters. Excessive conversion causes lower battery efficiency, leading to a reduced overall use time of the battery.

BRIEF SUMMARY OF THE INVENTION

A power module adapted to a computer system is provided in the disclosure. The power module includes three batteries, a first voltage output terminal, a second voltage output terminal, a third voltage output terminal, and a charging/discharging control unit. The charging/discharging control unit determines a quantity of serially connected batteries based on a load signal of the computer system, to supply a first voltage to the first voltage output terminal, a second voltage to the second voltage output terminal, or a third voltage to the third voltage output terminal. The first voltage, the second voltage, and the third voltage correspond to different quantities of batteries.

The disclosure further provides a power supply method adopted in a power module. The power module includes three batteries, and supplies power to a computer system. The power supply method includes: receiving a load signal of the computer system; and determining a quantity of serially connected batteries based on the load signal, to supply a first voltage, a second voltage, or a third voltage to the computer system. The first voltage, the second voltage, and the third voltage correspond to different quantities of batteries.

The power module provided in the disclosure supplies appropriate voltage output terminals according to requirements of different load states through combinations of voltages of a plurality of batteries. In this way, a quantity of times of voltage conversion is decreased, and losses during voltage conversion are reduced, to increase the use time of an electronic device.

BRIEF DESCRIPTION OF THE DRAWINGS

FIG. 6 is a flowchart of an embodiment of a power charging method according to the disclosure.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
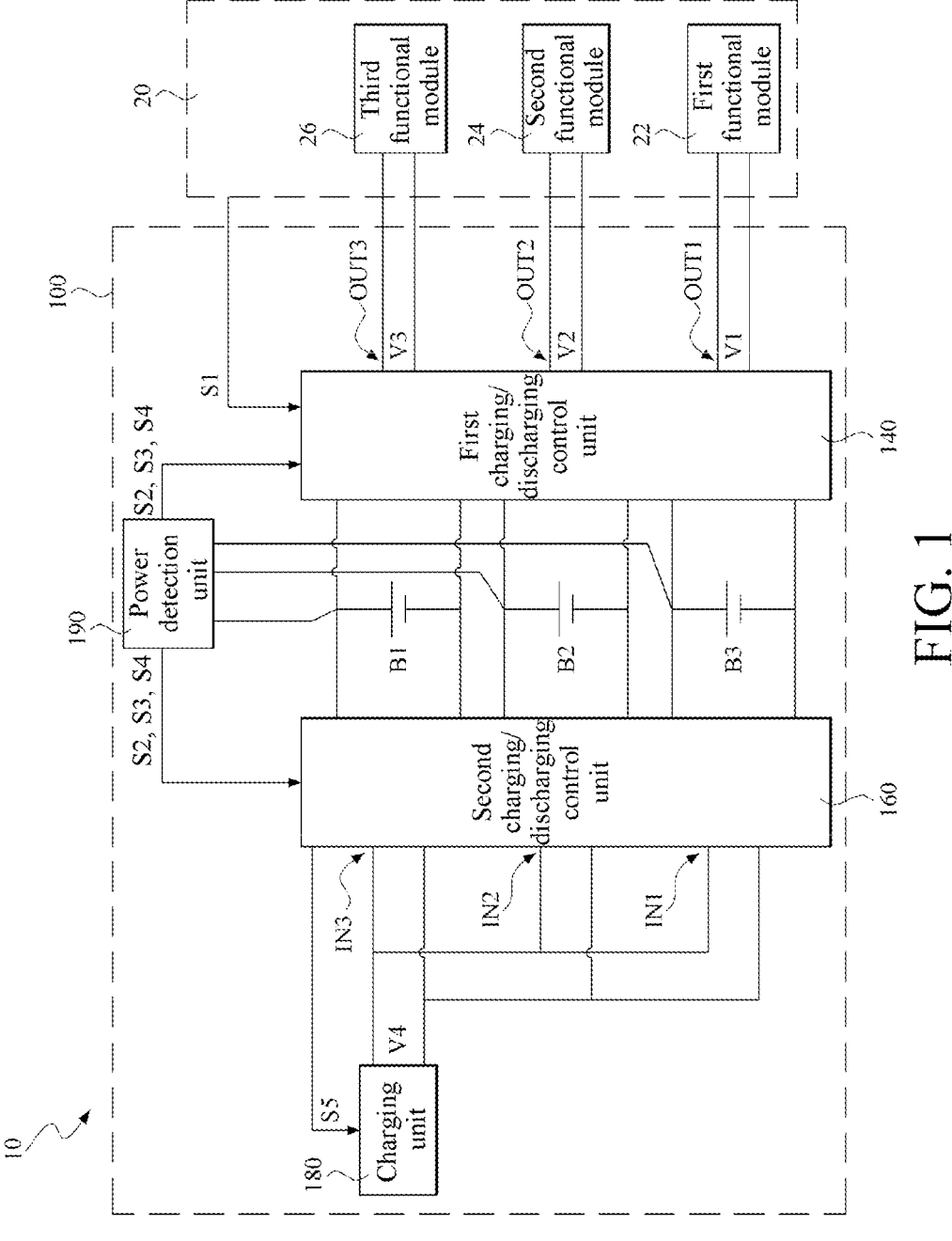
FIG. 1 is a schematic diagram of an embodiment of an electronic device according to the disclosure.

FIG. 1 is a schematic diagram of an embodiment of an electronic device according to the disclosure. As shown in the figure, the electronic device 10 includes a power module 100 and a computer system 20. The power module 100 supplies power required for operation of the computer system 20. In an embodiment, the electronic device 10 is a portable electronic device such as a smartphone or a laptop computer.

In an embodiment, the computer system 20 includes a first functional module 22, a second functional module 24, and a third functional module 26. Voltages required for operation of the functional modules are different. In this embodiment, a voltage required for operation of the third functional module 26 is higher than that of the second functional module 24, and the voltage required for operation of the second functional module 24 is higher than that of the first functional module 22. In an embodiment, the first functional module 22, the second functional module 24, and the third functional module 26 are speakers, screens, cameras, and vibrators. The power module 100 supplies the voltages required for operation of the functional modules.

As shown in the figure, the power module 100 includes three batteries B1, B2, and B3, a first voltage output terminal OUT1, a second voltage output terminal OUT2, a third voltage output terminal OUT3, a first voltage input terminal IN1, a second voltage input terminal IN2, a third voltage input terminal IN3, a first charging/discharging control unit 140, a second charging/discharging control unit 160, and a charging unit 180.

The first charging/discharging control unit 140 receives a load signal S1 of the computer system 20, and determines a quantity of serially connected batteries based on the load signal S1, to supply a first voltage V1 for the first voltage output terminal OUT1, a second voltage V2 for the second voltage output terminal OUT2, and a third voltage V3 for the third voltage output terminal OUT3. The first voltage V1, the second voltage V2, and the third voltage V3 are supplied to the first functional module 22, the second functional module 24, and the third functional module 26 of the computer system 20. Voltage levels of the voltages are different. In an embodiment, the first charging/discharging control unit 140 is a power supply control chip.

The first voltage V1, the second voltage V2, and the third voltage V3 correspond to different quantities of batteries. In an embodiment, a quantity of batteries corresponding to the first voltage V1 is 1, a quantity of batteries corresponding to the second voltage V2 is 2, and a quantity of batteries corresponding to the third voltage V3 is 3. Rated voltages of the three batteries B1, B2, and B3 are the same. Therefore, the voltage level of the third voltage V3 is higher than that of the second voltage V2. The voltage level of the second voltage V2 is higher than that of the first voltage V1. The voltage level of the second voltage V2 is approximately twice that of the first voltage V1. The voltage level of the third voltage V3 is approximately three times that of the first voltage V1. This is not limited. The batteries B1, B2, and B3 with different rated voltages are chosen based on the voltage levels of the first voltage V1, the second voltage V2, and the third voltage V3 that are actually to be generated.

In an embodiment, the batteries B1, B2, and B3 used in the embodiment are rechargeable lithium batteries, for example, a lithium battery 18650 with a rated voltage of 3.7 V.

In an embodiment, as shown in the figure, the power module 100 in the disclosure further includes a power detection unit 190. The power detection unit 190 is electrically connected to the batteries B1, B2, and B3, and respectively generates three power detection signals S2, S3, and S4 corresponding to the batteries B1, B2, and B3. The first charging/discharging control unit 140 is electrically connected to the power detection unit 190 to receive the power detection signals S2, S3, and S4. In an embodiment, the power detection signals S2, S3, and S4 are power supply voltages that respectively correspond to the batteries B1, B2, and B3.

In a case that all the batteries B1, B2, and B3 are not required to simultaneously supply power, in an embodiment, in a case that the first voltage V1 or the second voltage V2 need to be generated, the first charging/discharging control unit 140 determines, based on the power detection signals S2, S3, and S4 generated by the power detection unit 190, a battery from the batteries B1, B2, and B3 that is to supply power. In an embodiment, the first charging/discharging control unit 140 chooses a battery with more power from the batteries B1, B2, and B3 based on the power detection signals S2, S3, and S4 to supply power.

In an embodiment, the power detection unit 190 in the embodiment is a power gauge IC. However, the foregoing embodiment is not limited thereto. In other embodiments, battery power is directly detected by using the charging unit 180 or another microcontroller (MCU).

The second charging/discharging control unit 160 determines a battery from the batteries B1, B2, and B3 that is to be charged, and generates a charging signal S5 based on a quantity of batteries that are to be charged and sends the charging signal S5 to the charging unit 180. The charging unit 180 outputs a corresponding charging voltage V4 based on the charging signal S5 of the second charging/discharging control unit 160. The second charging/discharging control unit 160 chooses one, two, or all of the batteries B1, B2, and B3 to perform charging.

In an embodiment, the second charging/discharging control unit 160 is a charging control chip, and the charging unit 180 is a charger IC, or a buck-boost IC.

In an embodiment, the second charging/discharging control unit 160 is electrically connected to the power detection unit 190, to receive the power detection signals S2, S3, and S4, and determines, based on the power of the batteries B1, B2, and B3, a battery to be charged.

In a case that the second charging/discharging control unit 160 determines to charge one of the three batteries B1, B2, and B3, the second charging/discharging control unit 160 instructs the charging unit 180 to output a corresponding charging voltage V4 of a rated voltage of a single battery through the charging signal S5, and conducts a charging path between the first voltage input terminal IN1 and the one battery to be charged.

In a case that the second charging/discharging control unit 160 determines to charge two of the three batteries B1, B2, and B3, the second charging/discharging control unit 160 instructs the charging unit 180 to output a corresponding charging voltage V4 of twice the rated voltage of the battery through the charging signal S5, and conducts charging paths between the second voltage input terminal IN2 and the two batteries to be charged.

In a case that the second charging/discharging control unit 160 determines to charge all of the three batteries B1, B2, and B3, the second charging/discharging control unit 160 instructs the charging unit 180 to output a corresponding charging voltage V4 of three times the rated voltage of the battery through the charging signal S5, and conducts charging paths between the third voltage input terminal IN3 and the batteries B1, B2, and B3 that are to be charged.

Figure 2:
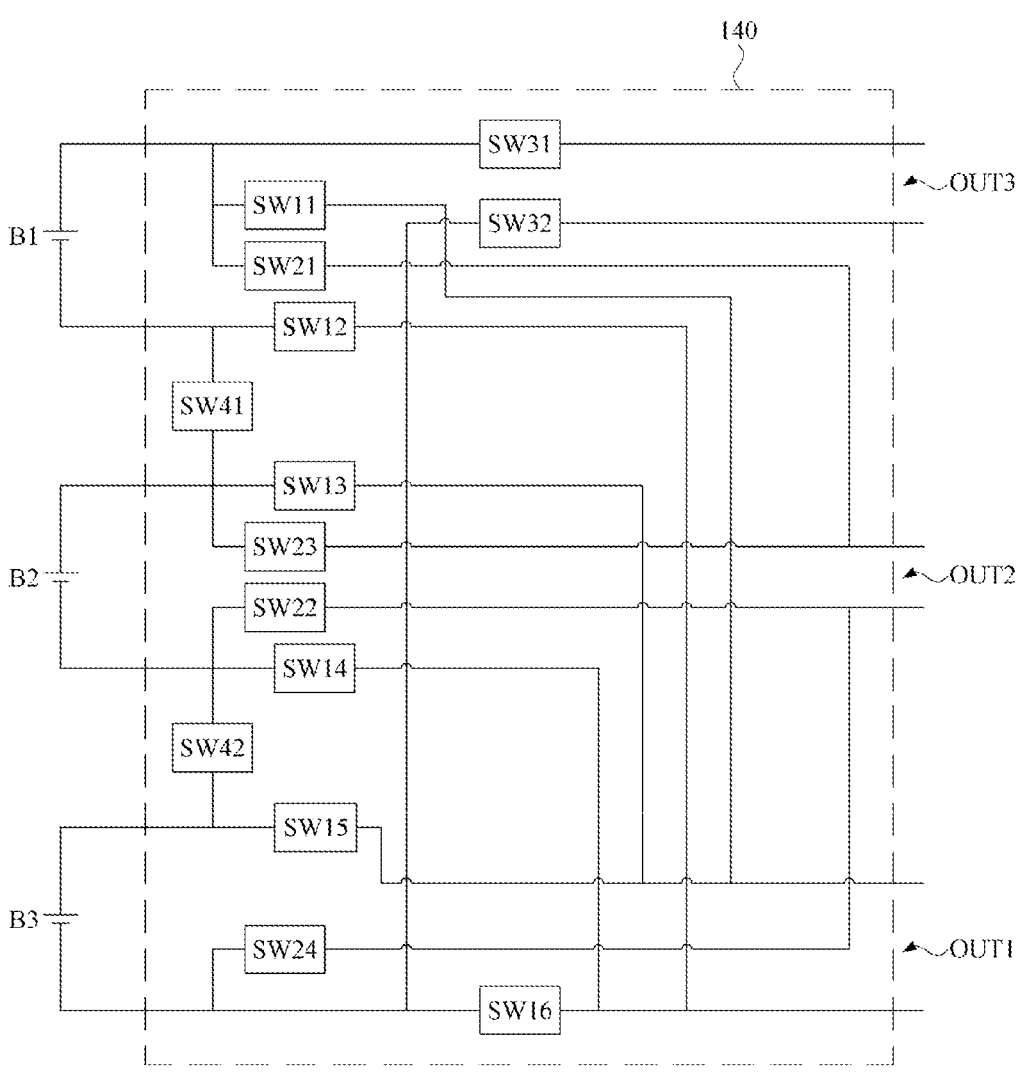
FIG. 2 is a schematic diagram of a circuit in an embodiment of a first charging/discharging control unit in FIG. 1.

FIG. 2 is a schematic diagram of a circuit in an embodiment of the first charging/discharging control unit 140 in FIG. 1. FIG. 3A to 3F show different power-supplying paths included in the first charging/discharging control unit 140.

As shown in the figures, the circuit of the first charging/discharging control unit 140 includes a series path P0, a plurality of first power-supplying paths P11, P12, and P13, second power-supplying paths P21 and P22, and a third power-supplying path P3. The series path P0 connects batteries B1, B2, and B3. The first power-supplying paths P11, P12, and P13 respectively extend to a first voltage output terminal OUT1 from the batteries B1, B2, and B3. The second power-supplying paths P21 and P22 respectively extend to a second voltage output terminal OUT2 from two of the batteries B1, B2, and B3. The third power-supplying path P3 extends to the third voltage output terminal OUT3 from two ends of the series path P0.

The first charging/discharging control unit 140 determines to supply a first voltage V1 to the first voltage output terminal OUT1, a second voltage V2 to the second voltage output terminal OUT2, and a third voltage V3 to the third voltage output terminal OUT3 by controlling conduction status of the series path P0, the first power-supplying paths P11, P12, and P13, the second power-supplying paths P21 and P22, and the third power-supplying path P3.

To match the three batteries B1, B2, and B3 used in the embodiment, the first charging/discharging control unit 140 in the embodiment includes a total of three first power-supplying paths P11, P12, and P13, two second power-supplying paths P21 and P22, and the third power-supplying path P3, to correspond to all possible combinations of the batteries B1, B2, and B3. However, the disclosure is not limited thereto. With different quantities of the batteries B1, B2, and B3, a quantity of power-supplying paths provided by the first charging/discharging control unit 140 is changing. In an embodiment, if a quantity of batteries is 2, the first charging/discharging control unit 140 only provides two first power-supplying paths and one second power-supplying path. If the quantity of batteries is 4, four first power-supplying paths (corresponding to the batteries), six second power-supplying paths (corresponding to any two of the four batteries), and four third power-supplying paths (corresponding to any three of the four batteries) are disposed at the first charging/discharging control unit 140, to correspond to any possible combinations of the four batteries. In an embodiment, in a case that the quantity of batteries is 4, a fourth power-supplying path is further disposed, to correspond to power supply of the four serially connected batteries.

Figure 3A:
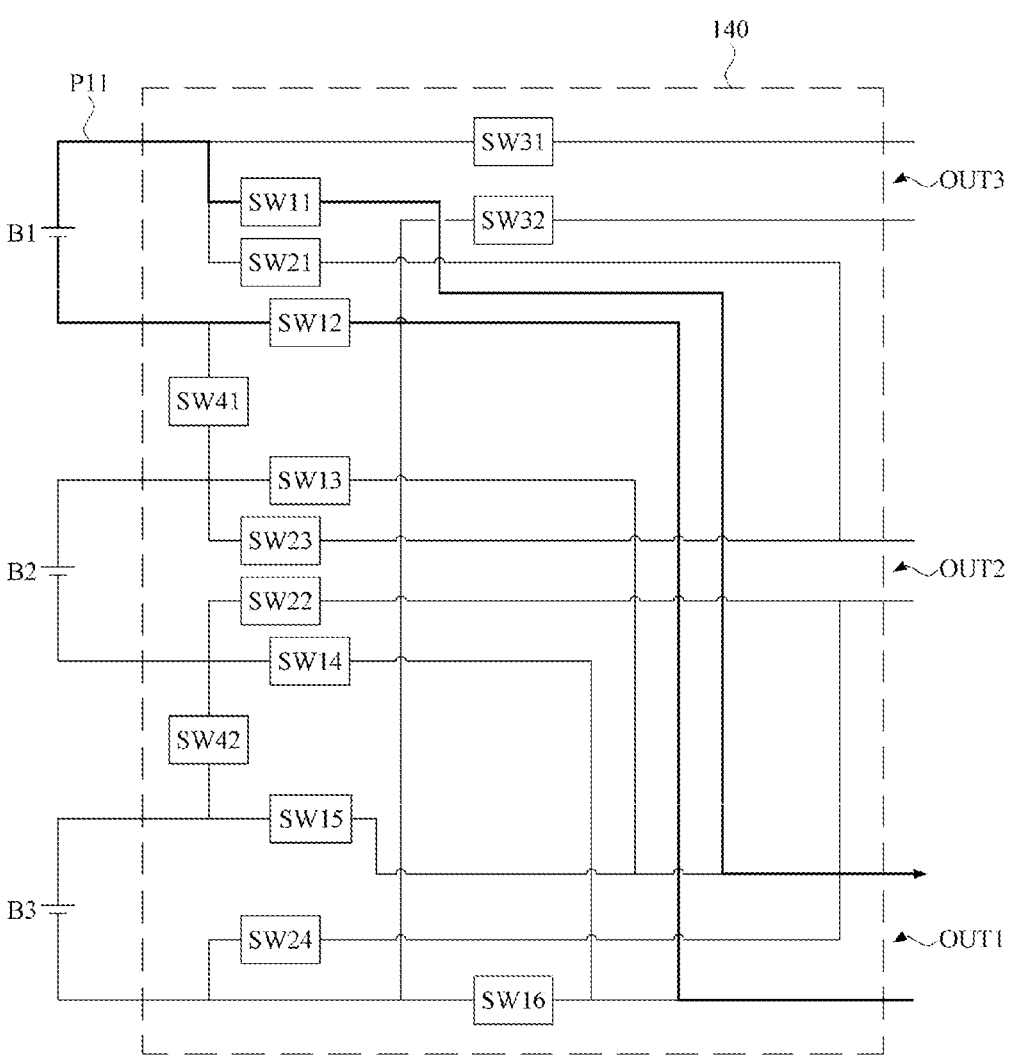
FIG. 3A to FIG. 3F show different power-supplying paths included in a first charging/discharging control unit.
Figure 3B:
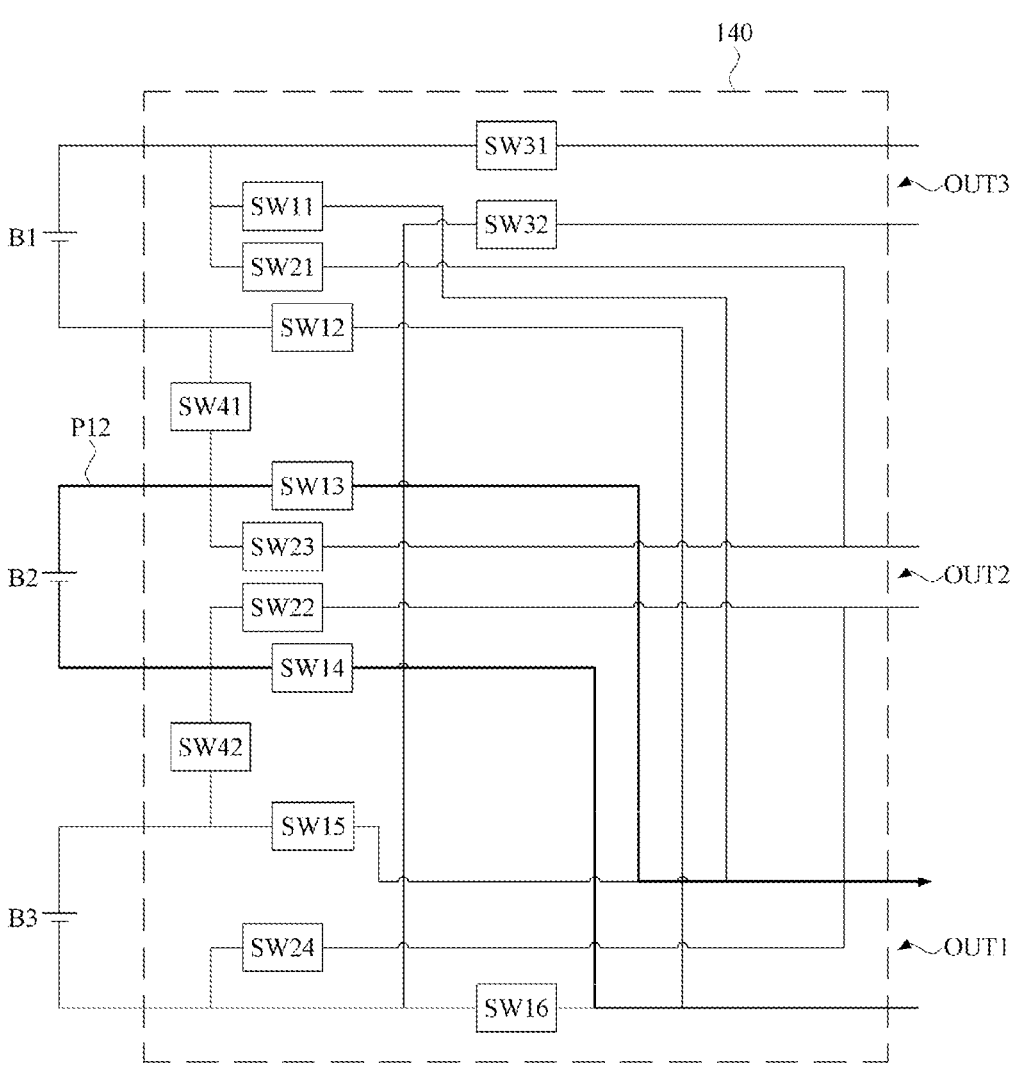
Figure 3C:
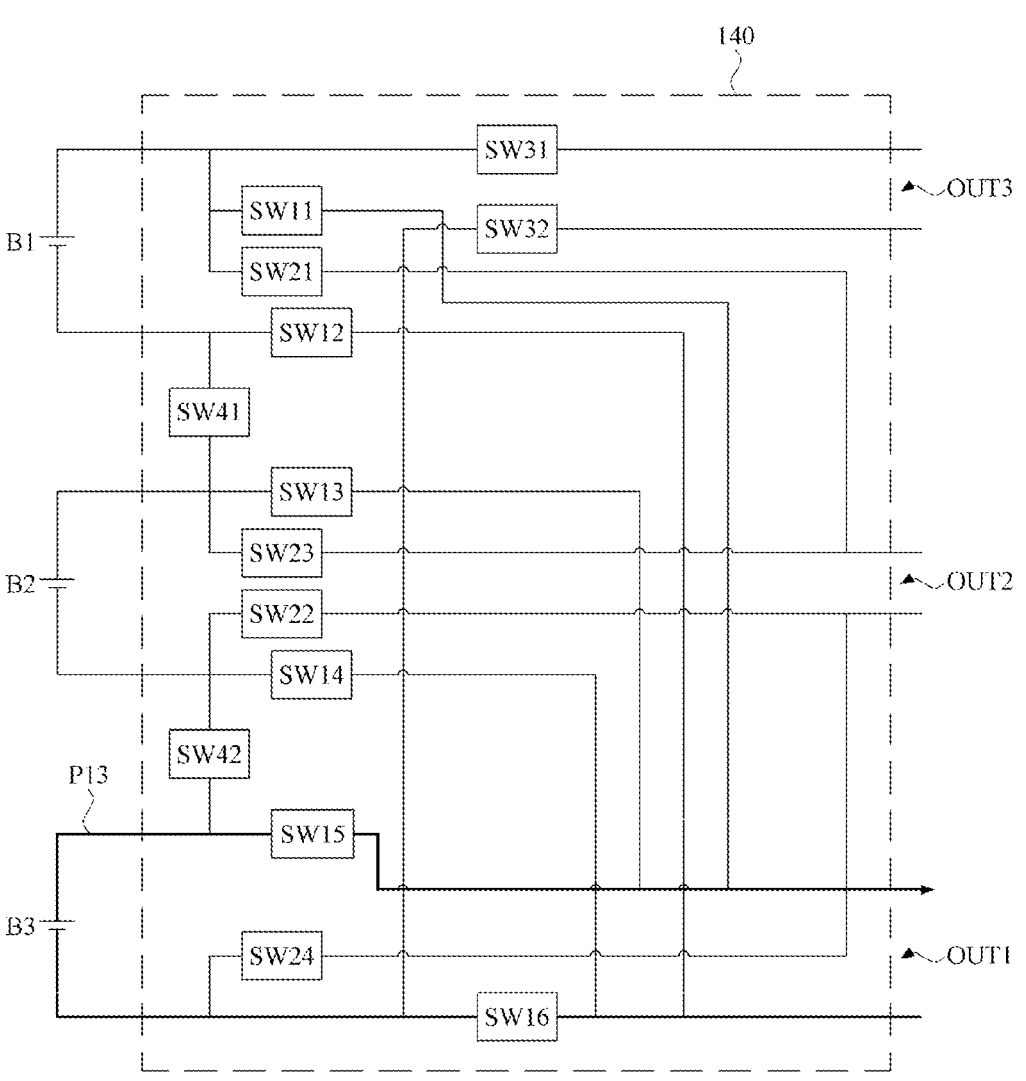

As shown in FIG. 3A to FIG. 3C, the first power-supplying paths P11, P12, and P13 respectively include two first switch elements SW11 and SW12, SW13 and SW14, and SW15 and SW16, to control the conduction status of the first power-supplying paths P11, P12, and P13. The first switch elements SW11 to SW16 are respectively located at circuits between two ends (that is, a positive electrode and a negative electrode of the battery) of corresponding batteries B1, B2, and B3 and the first voltage output terminal OUT1.

Further, the first switch elements SW11 and SW12 are located at the first power-supplying path P11 and at the two ends of the battery B1. The first switch elements SW13 and SW14 are located at the first power-supplying path P12 and at the two ends of the battery B2. The first switch elements SW15 and SW16 are located at the first power-supplying path P13 and at the two ends of the battery B3.

The first charging/discharging control unit 140 includes an MCU (not shown). The MCU switches between the first switch elements SW11 to SW16, to control the conduction status of the first power-supplying paths P11, P12, and P13.

Figure 3D:
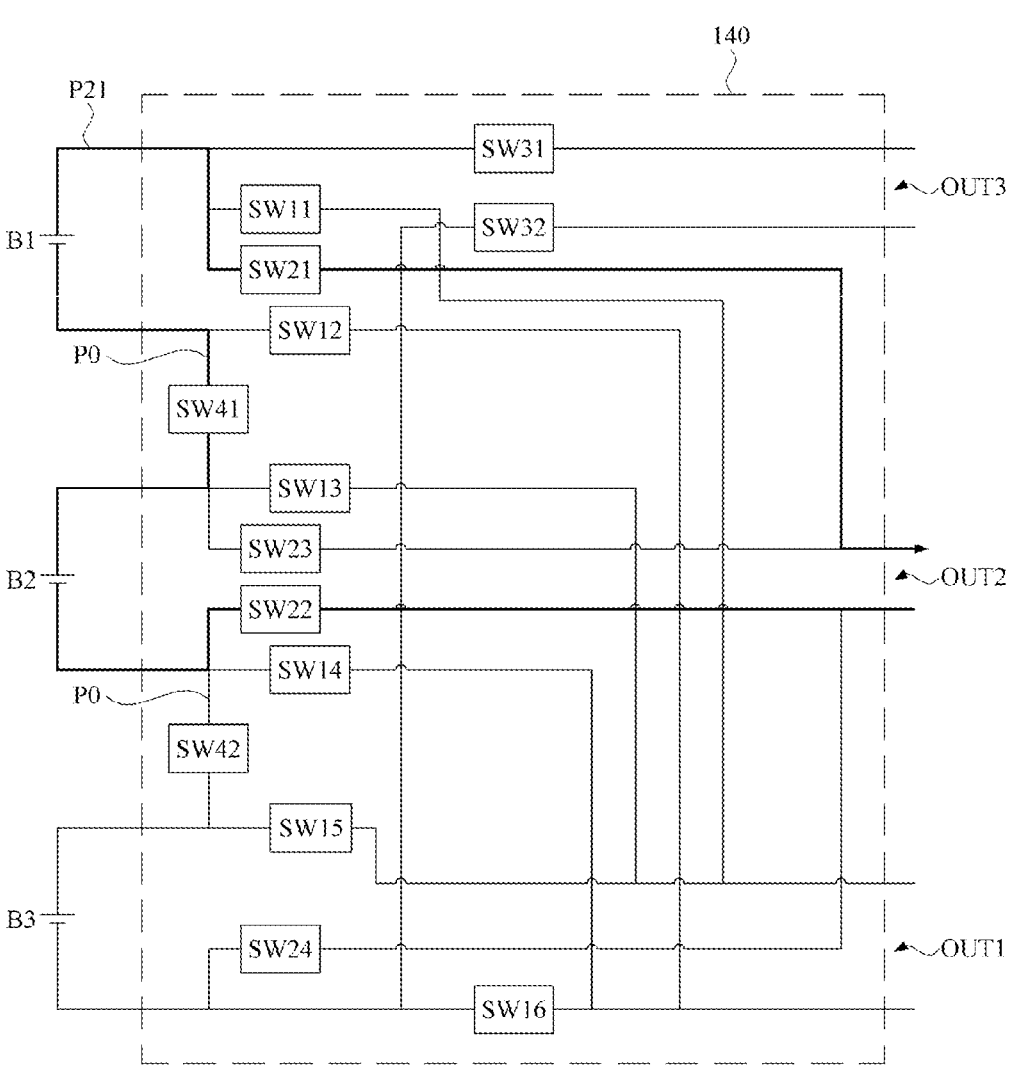
Figure 3E:
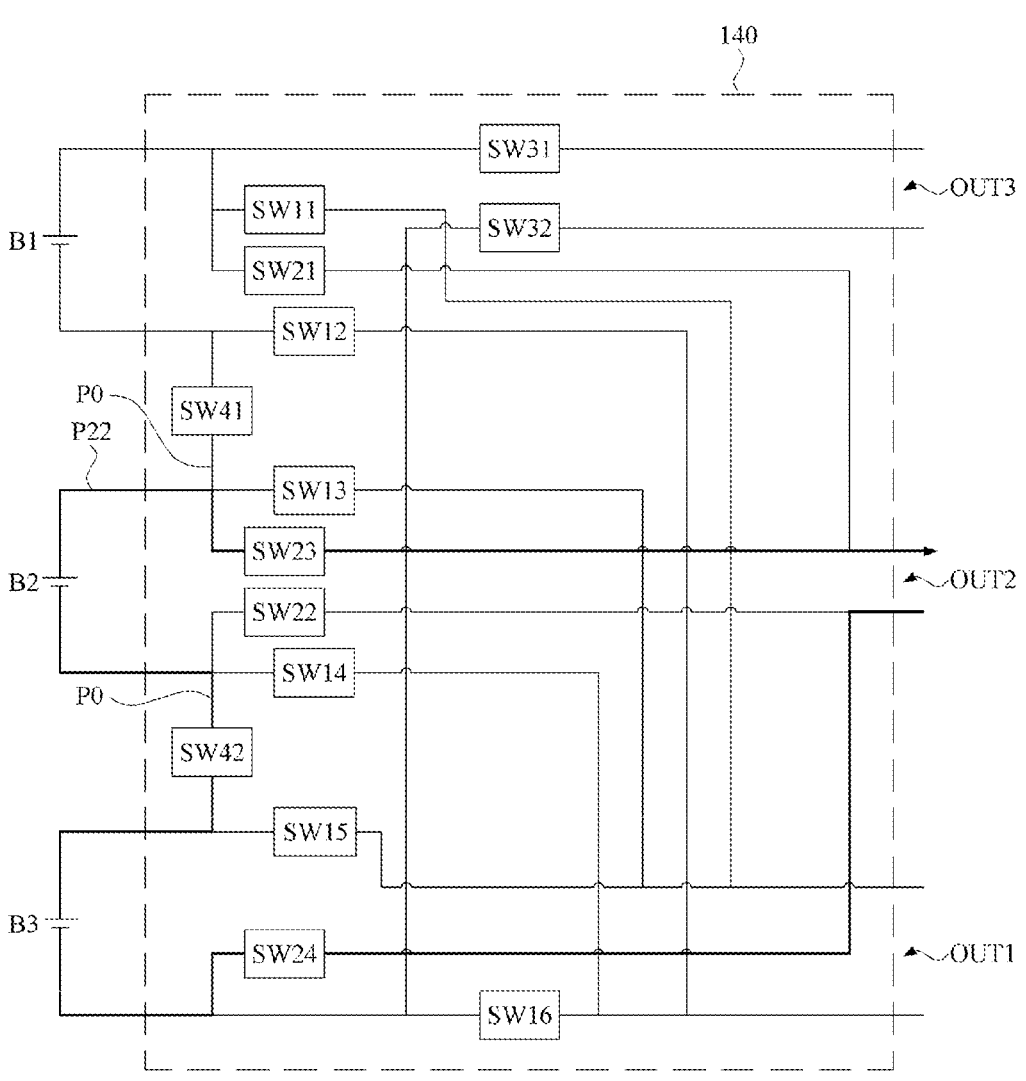

As shown in FIG. 3D and FIG. 3E, the second power-supplying paths P21 and P22 respectively include two second switch elements SW21 and SW22 and SW23 and SW24, to control conduction status of the second power-supplying paths P21 and P22. The second switch elements SW21 to SW24 are respectively located at circuits between two ends of two serially connected batteries and the second voltage output terminal OUT2.

Further, the second switch elements SW21 and SW22 are located at the second power-supplying path P21 and at two ends of the serially connected batteries B1 and B2. The second switch elements SW23 and SW24 are located at the second power-supplying path P22 and at two ends of the serially connected batteries B2 and B3. An MCU in the first charging/discharging control unit 140 switches between the second switch elements SW21 to SW24, to control the conduction status of the second power-supplying paths P21 and P22.

Figure 3F:
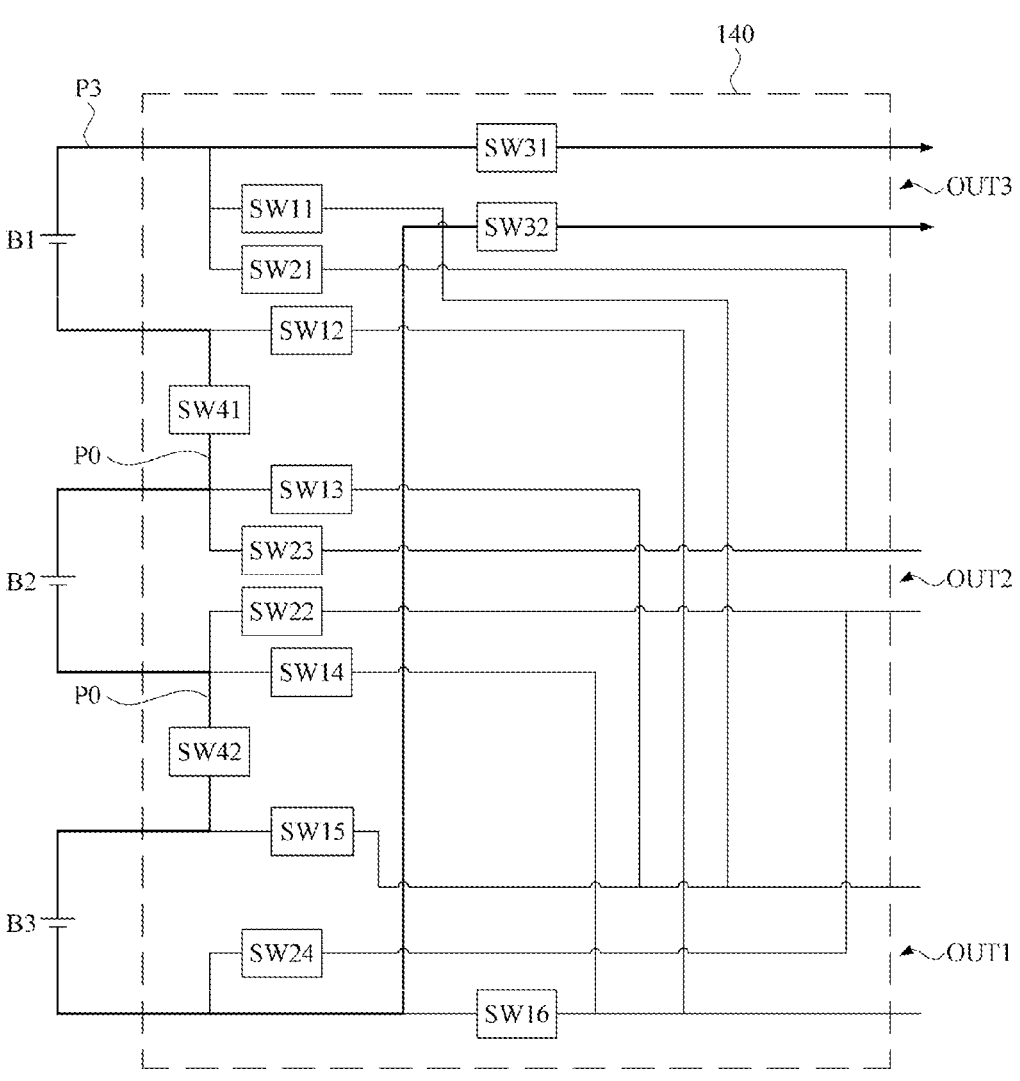

As shown in FIG. 3F, a third power-supplying path P3 includes two third switch elements SW31 and SW32, to control the conduction status of the third power-supplying path P3. The third switch elements SW31 and SW32 are located at circuits between two ends of three serially connected batteries B1, B2, and B3 and the third voltage output terminal OUT3. An MCU in the first charging/discharging control unit 140 switches between the third switch elements SW31 and SW32, to control the conduction status of the third power-supplying path P3.

The series path P0 includes two serial connection switch elements SW41 and SW42 that are respectively located at circuits between every two neighboring batteries B1, B2, and B3. The MCU in the first charging/discharging control unit 140 switches between the serial connection switch elements SW41 and SW42, to determine a battery that actually supplies power from the batteries B1, B2, and B3 in a case that the power module 100 supplies the first voltage V1 and the second voltage V2.

Table 1 shows the conduction status of used batteries and the switch elements in a case that the first charging/discharging control unit 140 controls the power module 100 to supply different outputs.

TABLE 1

| Output type | Used batteries | Conducting switch elements |
|---|---|---|
| First voltage V1 | B1 | SW11, SW12 |
| | B2 | SW13, SW14 |
| | B3 | SW15, SW16 |
| Second voltage V2 | B1, B2 | SW21, SW22, SW41 |
| | B2, B3 | SW23, SW24, SW42 |
| Third voltage V3 | B1, B2, B3 | SW31, SW32, SW41, SW42 |

As shown in Table 1 and referring to FIG. 3A to FIG. 3C together, in a case that the output type is the first voltage V1, three batteries, namely, the battery B1, the battery B2, and the battery B3, are used. If the battery B1 is used to supply power, the first switch elements SW11 and SW12 are conducted to conduct the first power-supplying path P11. If the battery B2 is used to supply power, the first switch elements SW13 and SW14 are conducted to conduct the first power-supplying path P12. If the battery B3 is used to supply power, the first switch elements SW15 and SW16 are conducted to conduct the first power-supplying path P13.

As shown in Table 1 and referring to FIG. 3D and FIG. 3E together, in a case that the output type is the second voltage V2, two combinations of batteries, namely, a combination of the battery B1 and the battery B2 and a combination of the battery B2 and the battery B3, are used. If the battery B1 and the battery B2 are used to supply power, the second switch elements SW21 and SW22 are conducted to conduct the second power-supplying path P21, and to conduct the serial connection switch element SW41 between the battery B1 and the battery B2. Similarly, if the battery B2 and the battery B3 are used to supply power, the second switch elements SW23 and SW24 are conducted to conduct the second power-supplying path P22, and to conduct the serial connection switch element SW42 between the battery B2 and the battery B3.

As shown in Table 1 and referring to FIG. 3F together, in a case that the output type is the third voltage V3, the battery B1, the battery B2, and the battery B3 are used to supply power. The third switch elements SW31 and SW32 and the serial connection switch elements SW41 and SW42 are conducted, to conduct the third power-supplying path P3 and the series path P0.

In an embodiment, the foregoing first switch elements SW11 to SW16, the second switch elements SW21 to SW24, the third switch elements SW31 to SW32, and the serial connection switch elements SW41 to SW42 are a metal-oxide-semiconductor field-effect transistor (MOSFET) or another semiconductor switch element.

Figure 4:
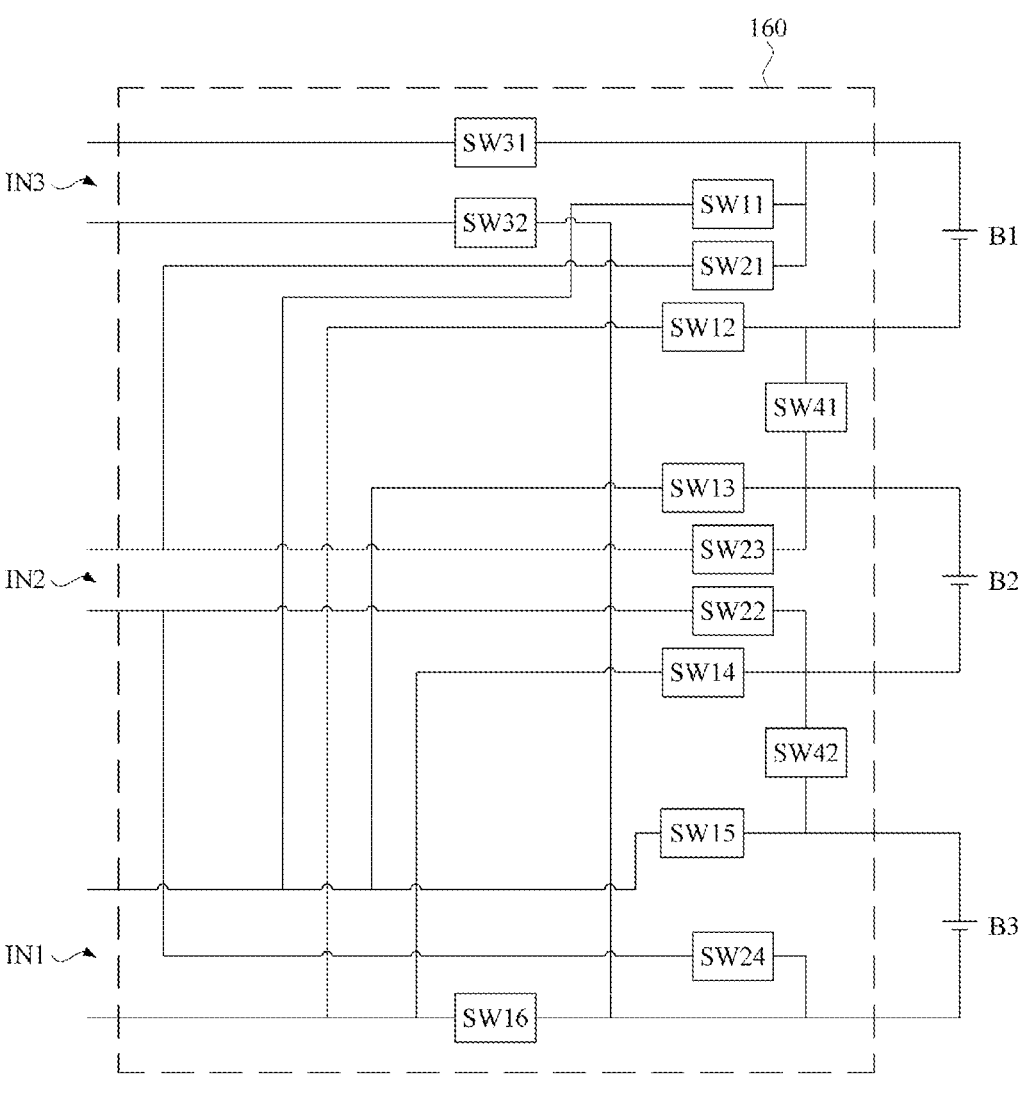
FIG. 4 is a schematic diagram of a circuit in an embodiment of a second charging/discharging control unit in FIG. 1.

FIG. 4 is a schematic diagram of a circuit in an embodiment of the second charging/discharging control unit 160 in FIG. 1.

Referring to FIG. 2 together, the second charging/discharging control unit 160 is generally the same as the first charging/discharging control unit 140. A difference between the two mainly lies in that the first charging/discharging control unit 140 supplies energy of the batteries B1, B2, and B3 to a computer system 20, and the second charging/discharging control unit 160 supplies a charging voltage V4 supplied by a charging unit 180 to the batteries for charging.

The first charging/discharging control unit 140 determines, based on a load signal S1 of the computer system 20, a quantity of serially connected batteries B1, B2, and B3 and which one or more of the batteries B1, B2, and B3 are serially connected. The second charging/discharging control unit 160 determines, based on the power of the batteries B1, B2, and B3, a quantity of batteries to be charged and which one or more of the batteries B1, B2, and B3 are to be charged.

A control architecture of batteries that are determined by the first charging/discharging control unit 140 to supply power is generally the same as that of batteries that are determined by the second charging/discharging control unit 160 for charging. The same numerals are used in the figure. Details are not described herein.

In the embodiments of FIG. 1, the power module 100 controls respectively a power supply procedure of a plurality of batteries B1, B2, and B3, and a charging procedure of a plurality of batteries B1, B2, and B3 by using the first charging/discharging control unit 140 and the second charging/discharging control unit 160. However, the disclosure is not limited thereto. In an embodiment, a single charging/discharging control unit is used to control the power supply procedure and the charging procedure of the power module 100. In an embodiment, the charging/discharging control unit uses the architecture shown in FIG. 2.

Figure 5:
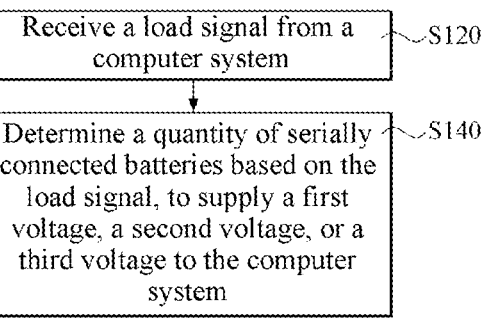
FIG. 5 is a flowchart of an embodiment of a power supply method according to the disclosure.

FIG. 5 is a flowchart of an embodiment of a power supply method according to the disclosure. The power supply method is applicable to the power module 100 shown in FIG. 1 and relates to the first charging/discharging control unit 140 in the power module 100 during operation. The power module 100 includes three batteries B1, B2, and B3 and supplies power to a computer system 20. The power supply method includes the following steps.

First, as described in step S120, a load signal S1 is received from the computer system 20. The load signal S1 shows a charging voltage required for charging of the computer system 20.

Subsequently, as described in step S140, a quantity of serially connected batteries is determined based on the load signal S1, to supply a first voltage V1, a second voltage V2, or a third voltage V3 to the computer system 20.

FIG. 6 is a flowchart of an embodiment of a power charging method according to the disclosure. The power charging method is applicable to the power module 100 shown in FIG. 1 and relates to the second charging/discharging control unit 160 in the power module 100 during operation. The power module 100 includes three batteries B1, B2, and B3 and supplies power to a computer system 20. The power charging method includes the following steps.

First, as described in step S220, power of the batteries B1, B2, and B3 is detected, to generate power detection signals S2, S3, and S4 corresponding to the batteries B1, B2, and B3.

Subsequently, as described in step S240, a battery from the batteries B1, B2, and B3 that is to be charged preferentially and a quantity of serially connected batteries are determined based on the power detection signals S2, S3, and S4.

The power module 100 provided in the disclosure supplies appropriate voltage output terminals according to requirements of different load states through combinations of voltages of a plurality of batteries. In this way, a quantity of times of voltage conversion is decreased, and losses during voltage conversion are reduced, to increase the use time of an electronic device. In addition, during charging, the power module 100 in the disclosure charges all the batteries at the same time to reduce the charging time, or charge a single battery based on the status of the batteries, to avoid rapid decline of the service life of a specific battery due to excessive consumption of the specific battery.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A power module, adapted to a computer system, and comprising:
   at least three batteries;
   a first voltage output terminal;
   a second voltage output terminal;
   a third voltage output terminal; and
   a charging/discharging control unit, determining a quantity of serially connected batteries based on a load signal of the computer system, to supply a first voltage to the first voltage output terminal, a second voltage to the second voltage output terminal, or a third voltage to the third voltage output terminal, wherein
   the first voltage, the second voltage, and the third voltage correspond to different quantities of batteries,
   the first voltage output terminal, the second voltage output terminal, and the third voltage output terminal correspond to different voltage levels,
   when the charging/discharging control unit is used for charging the batteries, the first output voltage terminal is used as a first voltage input terminal, the second output voltage terminal is used as a second voltage input terminal, the third output voltage termina is used as a third voltage input terminal, and the charging/discharging control unit determines a quantity of serially connected batteries to be charged based on power of the batteries to instruct a charging unit to output a first charging voltage to the first voltage input terminal, a second charging voltage to the second voltage input terminal, or a third charging voltage to the third voltage input terminal, and
   the first charging voltage, the second charging voltage, and the third charging voltage correspond to different quantities of batteries to be charged.

2. The power module according to claim 1, wherein rated voltages of the batteries are the same.

3. The power module according to claim 1, wherein a quantity of batteries corresponding to the first voltage is 1, a quantity of batteries corresponding to the second voltage is 2, and a quantity of batteries corresponding to the third voltage is 3.

4. The power module according to claim 3, further comprising:
   a series path, serially connecting the batteries;
   a plurality of first power-supplying paths, extending respectively to the first voltage output terminal from each of the batteries;
   a plurality of second power-supplying paths, extending respectively to the second voltage output terminal from any two of the batteries;
   a third power-supplying path, extending to the third voltage output terminal from two ends of the series path, wherein
   the charging/discharging control unit determines to supply the first voltage to the first voltage output terminal, the second voltage to the second voltage output terminal, or the third voltage to the third voltage output terminal by controlling conduction status of the series path, the plurality of first power-supplying paths, the plurality of second power-supplying paths, and the third power-supplying path.

5. The power module according to claim 4, wherein each of the first power-supplying paths comprises two first switch elements, located respectively on circuits between two ends of a corresponding battery and the first voltage output terminal.

6. The power module according to claim 4, wherein each of the second power-supplying paths comprises two second switch elements, located respectively on circuits between two ends of two serially connected batteries and the second voltage output terminal.

7. The power module according to claim 4, wherein the third power-supplying path comprises two third switch elements, located respectively on circuits between two ends of three serially connected batteries and the third voltage output terminal.

8. The power module according to claim 4, wherein the series path comprises two serial connection switch elements, located respectively on circuits between every two neighboring batteries.

9. The power module according to claim 1, further comprising a power detection unit, electrically connected to the batteries and respectively generating three power detection signals corresponding to the batteries.

10. The power module according to claim 9, wherein the charging/discharging control unit determines at least one of the at least three batteries to charge or discharge based on the power detection signals to supply power.

11. The power module according to claim 9, wherein the charging/discharging control unit determines at least one of the at least three batteries with more power to charge or discharge based on the power detection signals to supply power.

12. The power module according to claim 1, further comprising a first voltage input terminal, a second voltage input terminal, a third voltage input terminal and a charging unit, wherein the charging unit is electrically connected to the first voltage input terminal, the second voltage input terminal, and the third voltage input terminal, to selectively charge the batteries.

13. A power supply method, adapted to a power module, wherein the power module comprises at least three batteries, a first voltage output terminal, a second voltage output terminal, a third voltage output terminal and a charging/discharging control unit, and supplies power to a computer system, comprising:

receiving a load signal of the computer system; and determining a quantity of serially connected batteries based on the load signal, to supply a first voltage, a second voltage, or a third voltage to the computer system, wherein the first voltage, the second voltage, and the third voltage correspond to different quantities of batteries, the first voltage output terminal, the second voltage output terminal, and the third voltage output terminal correspond to different voltage levels, when the charging/discharging control unit is used for charging the batteries, the first output voltage terminal is used as a first voltage input terminal, the second output voltage terminal is used as a second voltage input terminal, the third output voltage termina is used as a third voltage input terminal, and the charging/discharging control unit determines a quantity of serially connected batteries to be charged based on power of the batteries to instruct a charging unit to output a first charging voltage to the first voltage input terminal, a second charging voltage to the second voltage input terminal, or a third charging voltage to the third voltage input terminal, and the first charging voltage, the second charging voltage, and the third charging voltage correspond to different quantities of batteries to be charged.

14. The power supply method according to claim 13, wherein a quantity of batteries corresponding to the first voltage is 1, a quantity of batteries corresponding to the second voltage is 2, and a quantity of batteries corresponding to the third voltage is 3.

* * * * *